No. 658,474. Patented Sept. 25, 1900.
C. F. SPARKS.
CLOTH CUTTER.
(Application filed Jan. 2, 1900.)

(No Model.) 2 Sheets—Sheet 1.

Witnesses
W. A. Alexander
David Stannard

Inventor
C. F. Sparks
By Attorneys
Fowler & Fowler

No. 658,474. Patented Sept. 25, 1900.
C. F. SPARKS.
CLOTH CUTTER.
(Application filed Jan. 2, 1900.)

(No Model.) 2 Sheets—Sheet 2.

Witnesses
W. A. Alexander
David Stannard

Inventor
C. F. Sparks
By Attorneys
Fowler & Fowler

UNITED STATES PATENT OFFICE.

CHARLES F. SPARKS, OF ALTON, ILLINOIS.

CLOTH-CUTTER.

SPECIFICATION forming part of Letters Patent No. 658,474, dated September 25, 1900.

Application filed January 2, 1900. Serial No. 10. (No model.)

*To all whom it may concern:*

Be it known that I, CHARLES F. SPARKS, a citizen of the United States, residing at Alton, Madison county, Illinois, have invented a certain new and useful Cloth-Cutting Machine, of which the following is such a full, clear, and exact description as will enable any one skilled in the art to which it appertains to make and use the same, reference being had to the accompanying drawings, forming part of this specification.

My invention relates to a machine for cutting strips of a predetermined length from a roll of cloth, and is especially adapted to cutting cloth for the manufacture of bags, such as are used in packing flour.

My invention consists in part in the combination, with a rotary member around which the material passes, of a cutter carried in said rotary member and adapted to project beyond the same, and means for feeding said cutter longitudinally of said rotary member.

My invention also consists in various other novel features and details of construction, all of which are described in the following specification and pointed out in the claims affixed hereto.

Figure 1:
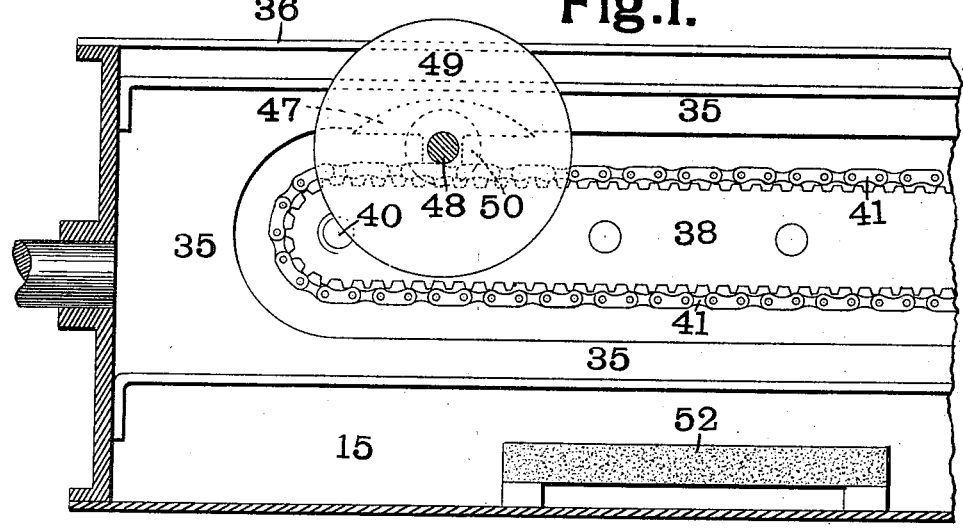
Figure 2:
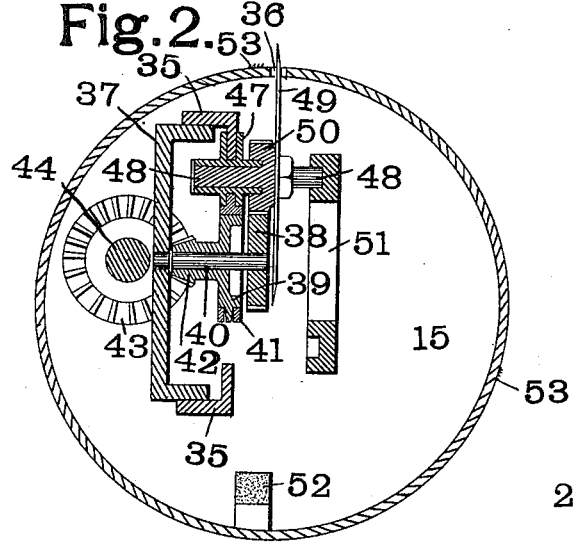
Figure 3:
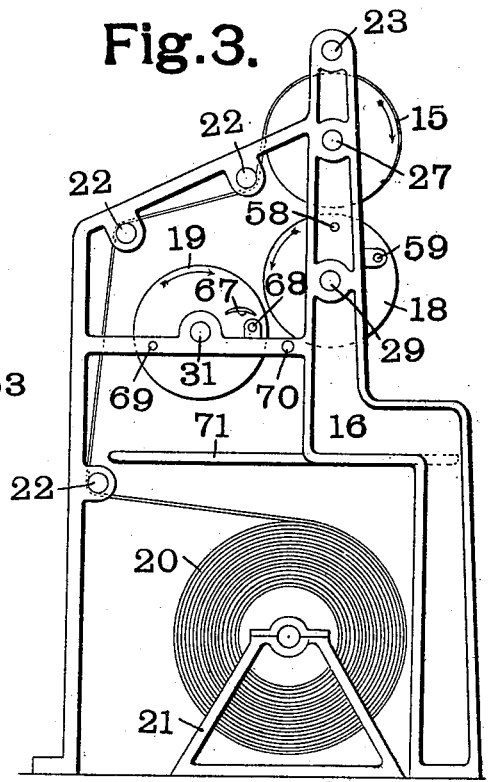
Figure 10:
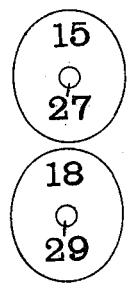
Figure 4:
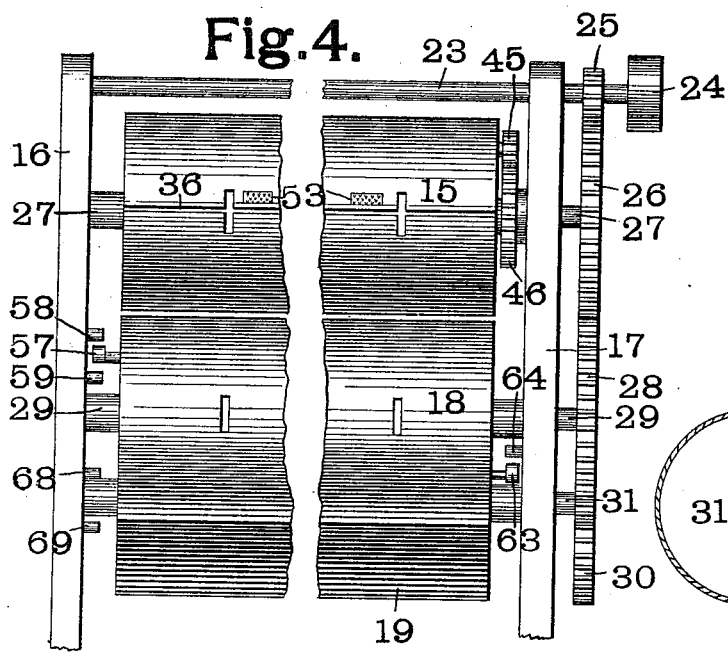
Figure 5:
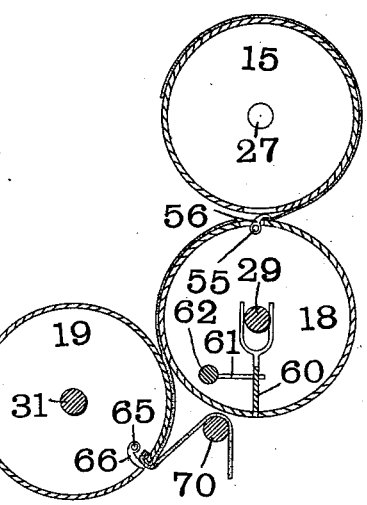
Figure 6:
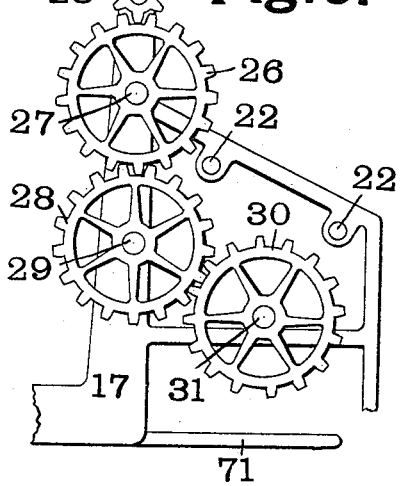
Figure 7:
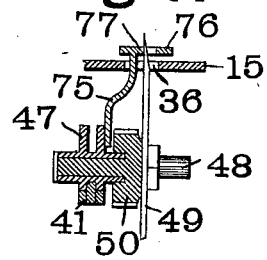
Figure 8:
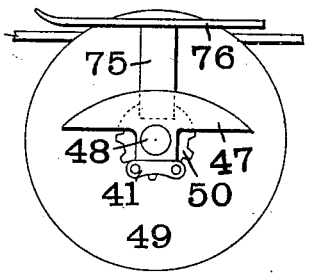
Figure 9:
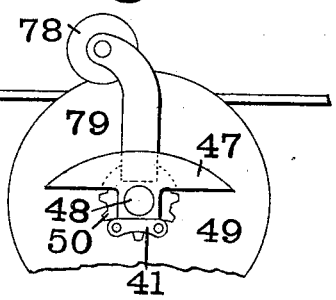

In the accompanying drawings, which illustrate one form of machine made in accordance with my invention, Figure 1 is a longitudinal section through a portion of the main or cutting cylinder. Fig. 2 is a cross-section of the same. Fig. 3 is an end view, on a reduced scale, of the complete machine. Fig. 4 is a side view. Fig. 5 is a diagrammatical vertical section. Fig. 6 is an end view showing the gearing. Fig. 7 is a section showing a detail of construction. Fig. 8 is a side view of the part shown in Fig. 7. Fig. 9 is a side view showing a detail of construction, and Fig. 10 is a view showing a modification.

Like marks of reference refer to similar parts in the several views of the drawings.

15 is the main or cutting cylinder, which is journaled in end frames 16 and 17. Journaled in the frames 16 and 17 below the cylinder 15 is a second cylinder 18.

19 is a cylinder, also journaled in the end frames 16 and 17 and situated at the rear of and slightly below the cylinder 18.

20 is the roll of material from which the strips are to be cut. Said roll 20 is journaled in frames 21.

22 represents guide-rollers which are journaled in the end frames 16 and 17, and 23 is a driving-shaft also journaled in said end frames and provided with a driving-pulley 24. The driving-shaft 23 has secured to it a spur-wheel 25, which meshes with a spur-wheel 26, secured to one of the trunnions 27 of the main or cutting cylinder 15. The spur-wheel 26 meshes with a spur-wheel 28, secured to the shaft 29 of the cylinder 18, and the spur-wheel 28 meshes with a spur-wheel 30, secured to the shaft 31 of the cylinder 19.

Secured within the main or cutting cylinder 15 is a guide 35, which is arranged adjacent to the part of the cylinder in which is formed a longitudinal slot 36. Secured to the guide 35 are cross-bars 37, from which is supported a rack-plate 38. At each end of the rack-plate 38 is a sprocket-wheel 39, journaled on a shaft 40, carried in the rack-plate 38 and cross-bars 37. Around the sprocket-wheels 39 passes an endless sprocket-chain 41. Secured to one of the sprocket-wheels 39 is a bevel gear-wheel 42, which meshes with a bevel gear-wheel 43, carried on a shaft 44, passing through the cylinder 15. Secured to the end of the shaft 44 is a spur-wheel 45, which meshes with a stationary spur-wheel 46, secured to the end frame 17. Secured to the sprocket-chain 41 are two wings, which embrace the guide 35. The wings 47 have journaled in them a stud 48, to which is secured a rotary cutter 49 and a spur-wheel 50. The end of the stud 48 preferably runs in a guide 51 to steady the cutter 49. The spur-wheel 50 meshes with the teeth on the rack-plate 38. The rotary cutter 49 projects through the longitudinal slot 36 and beyond the cylinder 15, as best shown in Figs. 1 and 2.

52 is a block of emery or other suitable grinding material, against which the rotary cutter 49 is adapted to bear in its return movement within the cylinder 15, so as to sharpen the said rotary cutter 49.

The cloth is prevented from slipping by licker-in points 53, which are preferably arranged in two rows on the periphery of the cylinder 15.

The cylinder 15 instead of being circular in cross-section may be made oval, as shown in Fig. 10, to change the girth of the cylinder, and consequently the length of cut, without otherwise altering the machine. When this is done, the cylinder 18 must be shaped correspondingly, so that its periphery will travel at the same speed.

Journaled in the cylinder 18 is a shaft 55, carrying fingers 56, which are adapted to grasp the end of the material on the cutting-cylinder 15. The shaft 55 is actuated by means of a cam 57 coming in contact with pins 58 and 59, carried by the end frame 16. Carried in the cylinder 18 is a folder-blade 60, which is actuated by means of a pin 61, carried on a shaft 62, journaled in said cylinder 18. The shaft 62 is actuated by means of a cam 63 striking a pin 64, carried by the end frame 17. Journaled in the cylinder 19 is a shaft 65, provided with fingers 66, adapted to grasp the cloth from the folder-blade 60 of the cylinder 18. The shaft 65 is actuated by means of a cam 67 striking pins 68 and 69, carried by the end frame 16. Below the cylinder 18 is a shaft 70, over which the end of the material is drawn by the cylinder 19. Below the cylinders 18 and 19 is a table 71.

One of the wings 47 may have secured to it an arm 75, carrying a guard-plate 76 for preventing the material from being raised off of the cylinder by the rotary cutter 49. One side of this guard-plate 76 is preferably formed into a cutting edge 77, Fig. 7, to coöperate with the rotary cutter 49 and make a shearing cut. In place of the guard-plate 46 a small rotary cutter 78 may be carried on an arm 79, secured to one of the wings 47 and driven by contact with the rotary cutter 49.

The operation of my machine is as follows: The material passes from the roll 20 over the guide-rollers 22 to the main or cutting cylinder 15. As the cylinder 15 is rotated the pinion-wheel 45 is driven by contact with a spur-wheel 46 and rotates the shaft 44. This communicates motion to the sprocket-wheel 39 by means of the bevel gear-wheels 42 and 43, thus driving the sprocket-chain 41. As the rotary cutter 49 is moved longitudinally by means of the chain 41 the said cutter is also rotated by the engagement of the spur-wheel 50 with the tooth-rack 38, and thus severs the material around the cylinder 15. The end of the severed strip of material is grasped by the fingers 56 on the cylinder 18 and carried around until the central portion of the strip is adjacent to the cylinder 19, when said portion is forced outwardly by means of the folder-blade 60 and grasped by the fingers 66 of the cylinder 19, the loose end being drawn over the roller 70. As soon as the strip of material has been folded it is released by the fingers 66 and falls upon the table 71.

Having fully described my invention, what I claim as new, and desire to secure by Letters Patent of the United States, is—

1. In a machine for cutting cloth or the like, the combination with a rotary member around which the material to be cut passes, of a cutter carried within said rotary member and adapted to project beyond the same, and means for feeding said cutter longitudinally of said rotary member.

2. In a machine for cutting cloth or the like, the combination with a rotary member around which the material to be cut passes, of a rotary cutter within said rotary member and adapted to project beyond the same, and means for feeding said cutter longitudinally of said rotary member.

3. In a machine for cutting cloth or the like, the combination with a rotary member around which the material to be cut passes, of a rotary cutter within said rotary member and adapted to project beyond the same, means for feeding said rotary cutter longitudinally of said rotary member, and gearing for rotating said rotary cutter.

4. In a machine for cutting cloth or the like, the combination with a rotary member around which the material to be cut passes, an endless chain carried within said rotary member, a cutter carried by said endless chain and adapted to project beyond said rotary member, and means for actuating said endless chain.

5. In a machine for cutting cloth or the like, the combination with a rotary member around which the material to be cut passes, of an endless chain carried in said rotary member, a rack also carried by said rotary member, a rotary cutter carried by said chain and adapted to project beyond said rotary member, and a spur-wheel carried by said rotary cutter and adapted to engage with said rack.

6. In a machine for cutting cloth or the like, the combination with a rotary member around which the material to be cut passes, of a rotary cutter carried by said rotary member and adapted to project beyond the same, means for feeding said rotary cutter longitudinally of said rotary member, and an auxiliary cutter coöperating with said rotary cutter to make a shearing cut.

7. In a machine for cutting cloth or the like, the combination with a rotary member around which the material to be cut passes, of a rotary cutter carried in said rotary member and adapted to project beyond the same, means for feeding said rotary cutter longitudinally of said rotary member, and a guard adjacent to said rotary cutter for holding the cloth close to said rotary member.

8. In a machine for cutting cloth and the like, the combination with a rotary member around which the material to be cut passes, of a rotary cutter carried in said rotary member and adapted to project beyond the same, means for feeding said rotary cutter longitudinally of said rotary member, and a combined guard and auxiliary cutter coöperating with said rotary cutter to form a shearing cut.

9. In a machine for cutting cloth or the like, the combination with a rotary member around which the material to be cut passes, of means carried by said rotary member for cutting the material transversely and means for removing the material from said rotary member and folding the same.

10. In a machine for cutting cloth or the like, the combination with a rotary member around which the material to be cut passes, of means carried by said rotary member for cutting the material, a second rotary member adapted to remove the material from said first rotary member, a folder-blade carried by said second rotary member, and a third rotary member adapted to remove the material from the second rotary member in a folded condition.

In testimony whereof I have hereunto set my hand and affixed my seal in the presence of the two subscribing witnesses.

CHARLES F. SPARKS. [L. S.]

Witnesses:
W. A. ALEXANDER,
M. A. HALDEMAN.